US00RE39872E

(19) United States
(12) Reissued Patent
Hu

(10) Patent Number: US RE39,872 E
(45) Date of Reissued Patent: Oct. 9, 2007

(54) ANTENNA DEVICE, A COMMUNICATION DEVICE INCLUDING SUCH AN ANTENNA DEVICE AND A METHOD OF OPERATING THE COMMUNICATION DEVICE

(75) Inventor: Annika Yidong Hu, Åkersberga (SE)

(73) Assignee: AMC Centurion AB, Akersberga (SE)

(21) Appl. No.: 10/922,148

(22) Filed: Aug. 19, 2004

Related U.S. Patent Documents

Reissue of:
(64) Patent No.: 6,492,952
Issued: Dec. 10, 2002
Appl. No.: 09/714,121
Filed: Nov. 17, 2000

(30) Foreign Application Priority Data

Nov. 17, 1999 (SE) ..... 9904154

(51) Int. Cl.
*H01Q 1/24* (2006.01)

(52) U.S. Cl. ..... 343/702; 343/700 MS
(58) Field of Classification Search ..... 343/700 MS, 343/702, 846
See application file for complete search history.

(56) References Cited

U.S. PATENT DOCUMENTS 5,444,452 A 8/1995 Itoh et al. ..... 343/700
5,606,332 A * 2/1997 Darden et al. ..... 343/790
5,706,015 A 1/1998 Chen et al. ..... 343/700
5,929,812 A 7/1999 Aminzadeh ..... 343/700
6,150,984 A * 11/2000 Suguro et al. ..... 343/702
6,204,817 B1 3/2001 Edvardsson ..... 343/702
6,212,413 B1 * 4/2001 Kiesi ..... 455/575.7
6,229,488 B1 * 5/2001 Lin et al. ..... 343/700 MS
6,239,765 B1 5/2001 Johnson et al. ..... 343/795
6,252,554 B1 6/2001 Isohatala et al. ..... 343/700 MS
6,618,012 B1 * 9/2003 Louzir et al. ..... 343/700 MS
2002/0008663 A1 * 1/2002 Suguro et al. ..... 343/700 MS

FOREIGN PATENT DOCUMENTS

EP 0821428 A2 1/1998
EP 0895299 A1 3/1999

* cited by examiner

*Primary Examiner*—Tho Phan
(74) *Attorney, Agent, or Firm*—Holland & Hart LLP

(57) ABSTRACT

An antenna device includes a first and a second internal antenna element and a common ground plane. The first element has an upper and a lower end portion. The first antenna element is adapted for use with a cellular mobile phone system and the second antenna element is adapted for use with a GPS system. To that end, the second element is elongated and adapted to receive circularly polarized radio signals by operation with linear polarization. This provides for a compact antenna device adapted for use with more than one communication system.

27 Claims, 2 Drawing Sheets

ANTENNA DEVICE, A COMMUNICATION DEVICE INCLUDING SUCH AN ANTENNA DEVICE AND A METHOD OF OPERATING THE COMMUNICATION DEVICE

Matter enclosed in heavy brackets [ ] appears in the original patent but forms no part of this reissue specification; matter printed in italics indicates the additions made by reissue.

CROSS REFERENCE TO RELATED APPLICATIONS

The present invention is related to, and claims priority from, Swedish Patent Application No. 9904154-3, filed Nov. 17, 1999, the entire contents of which are hereby incorporated by reference in its entirety for all purposes.

FIELD OF INVENTION

The present invention relates generally to an antenna device and more particularly to [a combined] *an* antenna device including an internal global positioning system (GPS) antenna [and at least one internal antenna for cellular radio communication].

BACKGROUND

The use of a Global Positioning System(GPS)for determining the position of a terminal (such as a mobile phone) is increasing. GPS typically uses electromagnetic waves with circular polarization and a center frequency of 1.575 GHz. Today, the terminal is often a dedicated GPS terminal with an antenna arrangement adapted for GPS communication. The antenna is often a patch or quadrifilar helical antenna.

However, these types of antennas occupy a large space, especially the helical antenna. Also, a patch antenna has a considerable extension in two dimensions, making it difficult to place on a small substrate. It also requires a ground plane separated from the patch and being larger than the patch element.

The use of mobile phones and multi-purpose communication devices is increasing. Among the cellular mobile phone systems in use today can be mentioned the GSM system, using linearly polarized electromagnetic waves belonging to frequency bands of 900, 1800 or 1900 MHz, and the CDMA, JPC and AMPS systems.

There is a desire to integrate the functions of the GPS and the mobile phone systems into one terminal, i.e., a hand-portable radio communication device with a GPS function as well. However, the competing desire to make mobile phones compact poses special problems when designing the antenna arrangement adapted for use with both systems.

It is known antenna arrangements including a vehicle antenna for satellite navigation and for mobile radio communication. In one conventional device an arrangement including both a GPS antenna and an antenna working in the GSM bands. However, this arrangement is a flat-topped antenna apparatus intended for arrangement on a conducting surface. The radiating and receiving elements of the different antennas are arranged essentially parallel to each other and in different planes.

In another conventional device a radio communication device including a conventional cellular antenna and a GPS antenna in the form of a helical antenna are placed in an elongated antenna holder resembling a conventional rod antenna. The helical antenna is spaced apart from the terminal body by a communicating section in the antenna holder. Alternatively, this device uses a patch-like antenna element in the upper part of the terminal body mounted on a flat substrate. On the underside of the substrate is a ground plane for the patch-like antenna element. This configuration is not suited for use with a portable radio communication device, such as a mobile phone, due to is space-demanding configuration.

What is needed, therefore, is an antenna device for use in a terminal that overcomes the shortcomings of conventional devices described above.

SUMMARY OF THE INVENTION

The present invention is therefore directed to an antenna device, a communication device including the antenna device and a method of operating and the communication device that substantially overcomes one or more of the problems due to the limitations and disadvantages noted above.

*An object of the present invention is to provide a compact antenna device including an antenna for circularly polarized electromagnetic waves, such as for the GPS system.*

An object of the present invention is to provide a compact antenna device including both an antenna for circularly polarized electromagnetic waves, such as for the GPS system, and at least one antenna for linearly polarized electromagnetic waves, such as for cellular mobile telephone systems.

Another object is to provide a radio communication device incorporating an antenna arrangement operating both with linearly and circularly polarized radio signals.

Still another object is to provide a method of operating a portable radio communication device having a first and a second antenna element.

The invention is based on the realization that an elongated element can be used as an antenna for receiving circularly polarized electromagnetic waves, such as those used in the GPS system, and that a common ground plane can be used for *embodiments of the invention having* antennas operating with different kinds of polarization.

To achieve the above and other objects, an antenna device disposed in a terminal is disclosed, having [a first antenna element adapted to transmit and receive electromagnetic waves and second] *an* antenna element *that is elongated and is* adapted *solely* to receive circularly polarized radio signals *by operation with linear polarization.*

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF DRAWINGS

The invention is best understood from the following detailed description when read with the accompanying drawing figures. It is emphasized that the various illustrated features are not necessarily drawn to scale. In fact, the dimensions may be arbitrarily increased or decreased for clarity of discussion. It is emphasized that the various features are not necessarily drawn to scale. In fact certain features may be increased or decreased in dimension for clarity of discussion.

DETAILED DESCRIPTION OF THE ILLUSTRATIVE EMBODIMENTS

In the following description, for purposes of explanation and not limitation, exemplary embodiments disclosing specific details are set fourth in order to provide a thorough understanding of the present invention. However, it will be apparent to one skilled in the art that the present invention may be practiced in other embodiments that depart from these specific details. In this disclosure it is to be understood that the antenna device of the invention is operable to transmit and/or receive electromagnetic signals. Even if a term is used herein that suggests one specific signal direction it is to be appreciated that such a situation can cover that signal direction and/or its reverse, unless specifically stated otherwise.

Figure 1:
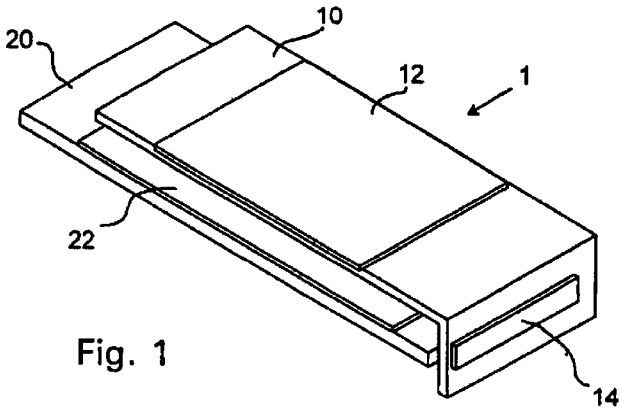
FIG. 1 is a perspective view of an antenna device according to an exemplary embodiment of the invention.
Figure 2:
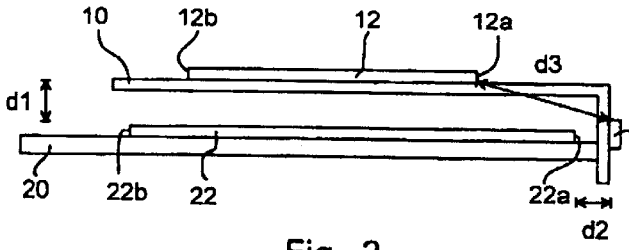
FIG. 2 is an elevation view of the device of FIG. 1.

Referring initially to FIGS. 1 and 2 an antenna device 1 including a member 10 for supporting radiating elements according to an illustrative embodiment of the present invention is shown. The member 10 is generally flat dielectric support and is provided with a fold giving it a shape resembling an L when viewed from the side. Mounting elements (not shown) are provided for attaching the member 10 to a generally planar PCB 20 of a portable communication device (terminal), such as a portable mobile phone. The PCB 20 is provided with relatively large conducting portions 22 functioning as a ground plane or ground conductor of the antenna device. (Herein the terms conductive portion 22, ground plane 22 and ground conductor 22 may be used interchangeably). The ground plane is provided with an upper end portion 22a and a lower end portion 22b. The references to "upper" and "lower" refer to the general orientation of the device during operation.

The upper surface of the device 10 as is provided with a first antenna element 12 functioning as a first radiating and receiving element of a cellular mobile phone antenna, the ground plane thereof being the conductive portion 22 (or ground plane or ground conductor). The first antenna element 12 is illustratively an electrically conducting layer and is provided with an upper end portion 12a and a lower end portion 12b. The first antenna element 12 and the conducting portion or ground plane 22 are positioned in essentially mutually parallel planes and separated by a predetermined distance d1. The first antenna element 12 has a feed portion (not shown) and is connected to the ground plane by of ground connection elements (not shown). Illustratively, this forms a Planar Inverted R Antenna (PIFA).

Figure 3:
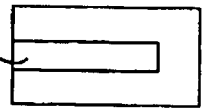
FIG. 3 is an end view of the device of FIG. 1.

As shown in FIGS. 2 and 3, the folded portion of the member 10 includes a rectangular substrate on which a second antenna element 14, which is illustratively an electrically conducting layer. The second antenna element 14 has an elongated shape and is provided with a feed element (not shown) at one end thereof.

The second antenna element 14 is provided at a distance d3 from the upper end portion 12a of the first antenna element 12. The mutual distances of the first and second antenna elements 12, 14 and the ground plane 22 are important to the performance of the antenna device. Illustratively, the distance d1 between the ground plane 22 and the first antenna element 12 is shorter than the distance d3 between the first and second antenna elements 12, 14. Moreover, the distance d2 between the ground plane and the second antenna element 14 is shorter than the distance d3 between the first and second antenna elements 12, 14.

Second element 14 it has been found to function well as a receiving GPS antenna element, i.e., as an element for receiving circularly polarized waves. As is seen in FIG. 2, the antenna element 14 is positioned essentially in the plane of the ground plane 22 and at a predetermined distance d2 therefrom. Also, the second antenna element 14, being essentially strip shaped, is positioned essentially perpendicular to the ground plane 22. In the exemplary embodiment of FIGS. 1-3, a suitable mutual distance d2 of the ground plane 22 and the second antenna element 14 is about 7-9 mm. Thus, the GPS antenna uses this conducting portion 22 as the ground plane. This positioning has been found to provide particularly good characteristics for the GPS antenna.

It is to be appreciated that the second antenna element 14 only receives circularly polarized waves with the configuration described herein. However, this is not a significant problem in the illustrative embodiment as GPS signal are received by but not transmitted by the terminal. The GPS information can be used for example in an emergency situation wherein an emergency call can automatically transmit the position of the phone to an emergency central.

Figure 4:
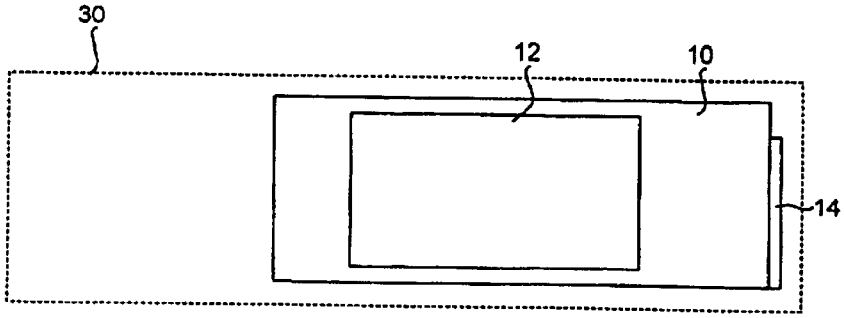
FIG. 4 is a plan view of the device of FIG. 1.
Figure 5:
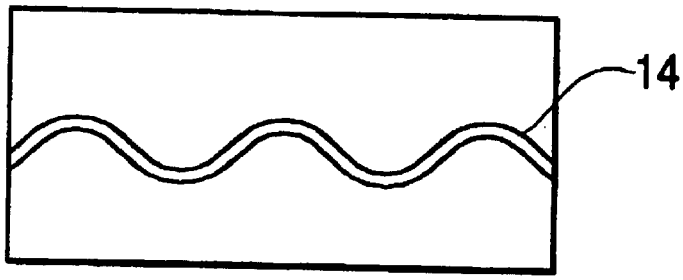
FIGS. 5 and 6 are end views of the device of FIG. 1 having a strip shape, and a meander shape, respectively.
Figure 6:
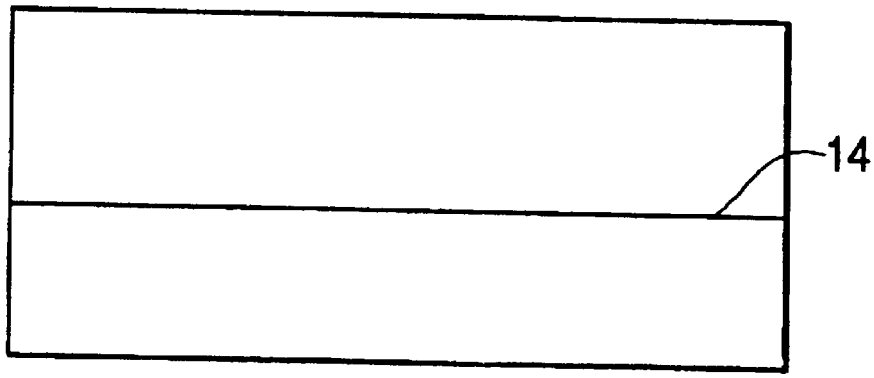

Turning to FIG. 4, a housing 30 of an exemplary radio communication device or terminal, such as a mobile phone, is shown by broken lines. FIG. 4 is a plan view of the backside of the device (i.e., the side pointing away from the user when in operation). The terminal is provided with a keypad (not shown) functioning as a user interface.

The antenna device 1 is positioned in the upper portion of the terminal when in an exemplary operating position. In this case it is positioned in the right hand portion as shown in FIG. 4.

This provides for a position of the second antenna element 14 that is particularly suitable in connection with satellite communication (which is the preferred vehicle for GPS communication), because the user will point generally upward with the antenna element portion of the terminal when using the terminal. Thus, in operation the antenna device 1 is oriented with the upper end portion 22a of the ground plane 22 pointing generally upwards and with the GPS antenna element 14 being positioned above the ground plane by the distance d2.

The length of the second antenna element 14 is adapted to the frequency of the GPS system, i.e., 1.575 GHz. In the exemplary embodiment shown, the second antenna element 14 used to receive GPS signals is a so-called quarter wave antenna with a length of approximately 5 cm for the GPS system. It should be noted that this length refers to the total effective length from the feed point of the second antenna element 14.

The antenna device 1 may be provided with separate feed points for the first and second antenna elements 12 and 14. Thus, the function can be switched between the two antennas, depending on the desired application. The two antennas can also be in use simultaneously.

The above described embodiment provides an antenna device which is compact, easy to manufacture and easy to assemble. Both the height and the width of the device can be made to fit in a modern compact size mobile phone.

It is realized that the antenna device according to the invention can be varied within the scope defined by the appended claims. Thus, the radiating and receiving elements have been shown with specific shapes. It is realized that they can have any suitable shape adapted for the specific requirements on the antenna element in question. Thus, although the first antenna element 12 has been shown with a generally planar shape, it is realized that it can be slightly arched, thereby being adapted to the overall shape of the cover in which the antenna device is mounted.

A PIFA has been described with the above exemplary embodiment. It is to be understood that the first antenna element 12 and ground plane 22 for linearly polarized electromagnetic waves can be any suitable antenna configuration, including a radiating element such as a patch element; a meander shaped element; a modified PIFA; or a micro strip antenna in general. Thus, the first antenna element 12 and ground plane 22 can be any antenna device suitable to be built in into a terminal housing, such as a mobile phone housing.

The second antenna element 14 has been described as functioning as a GPS antenna. It is also possible to provide the second antenna element 14 to function as an antenna for other circularly polarized electromagnetic waves.

The second antenna element 14 of the GPS antenna has been described as an elongated, essentially strip-like element. In an alternative embodiment, this element is given a meander shape. In that way, the effective length of the element is extended, thus providing a more compact antenna device.

Alternatively, the second antenna element 14 can be provided as a circular wave, thereby simplifying the manufacturing thereof. This wire can be provided with an inner portion extending from a connection point of the PCB and an outer portion bent essentially 90 degrees in relation to the inner portion and having an extension essentially corresponding to the extension of the second antenna element 14 described in connection with the above described exemplary embodiment.

The second antenna element 14 of the GPS antenna has been shown positioned in and perpendicular to a plane of the ground plane 22. However, the exact position of the second antenna element 14 can vary. For example, the second antenna element 14 can be provided closer to the plane of the first antenna element 12 or even in that plane, while being perpendicular thereto. The first and second antenna elements 12, 14 can be provided on the same surface of the substrate.

The first and second elements antenna 12, 14 have been shown mounted on an L-shaped substrate 10. It is realized that they can be provided in any suitable way and on any suitable substrate as long as they have the described mutual position described herein.

The feed element of the antenna element 14 has been described as being positioned at one end of the element. It is realized that the position of the feed element can be varied depending on the desired characteristics of the antenna element.

Although the ground plane 22 has been shown with a rectangular shape it should be appreciated that it can take a number of shapes as it constitutes the grounding paths of the PCB 20. However, it is preferred that the upper end portion 22a thereof is essentially straight.

The terms "upper" and "lower" end portions have been used to designate the upper and lower edges of the first antenna element 12 and the ground plane 22 in an exemplary operating position. However, with alternative configurations, such as a meander shaped first radiating element, these terms refer to the portions constituting the uppermost and lowermost parts of the first antenna element 12 and the ground plane 22 in operation of the device.

Throughout this application, with the expression "internal antenna" or "internal antenna element" is to be understood an antenna or antenna element provided within the housing of a radio communication device or on a surface of a non-protruding portion of the housing of the device.

It will be obvious that the invention may be varied in a plurality of ways. Such variations are not to be regarded as a departure from the scope of the invention. All such modifications as would be obvious to one skilled in the art are intended to be included within the scope of the appended claims.

What is claimed is:

1. An antenna device for a portable radio communication device, comprising:

a ground conductor positioned essentially in a plane and having front and back surfaces and an upper and a lower end portion, a first antenna element having [a] an upper end portion and a lower end portion, said first element being essentially parallel to and spaced apart from said back surface of said ground conductor by first distance, wherein said first antenna element is adapted to receive linearly polarized radio signals; and a second antenna element being spaced apart from said upper end portion of said ground conductor by a second distance, and said second antenna element being spaced apart from said upper end portion of said first antenna element by a third distance, wherein said second antenna element is elongated and is adapted solely to receive circularly polarized radio signals by operation with linear polarization.

2. The antenna device according to claim 1, wherein said second antenna element is closer to said upper end portion of said first antenna element than said lower end portion of said first antenna element.

3. The antenna device according to claim 1, wherein said second antenna element is positioned essentially in the plane of said ground conductor.

4. The antenna device according to claim 1, wherein said second antenna element is essentially parallel to said upper end portion of said ground conductor.

5. The antenna device according to claim 1, wherein said upper end portion of said ground conductor is essentially straight.

6. The antenna device according to claim 1, wherein said second antenna element is essentially strip shaped.

7. The antenna device according to claim 6, wherein said second antenna element is positioned in a plane essentially perpendicular to said plane of said ground conductor.

8. The antenna device according to claim 1, wherein said second antenna element is meander shaped.

9. The antenna device according to claim 1, wherein said second antenna element is wire shaped.

10. The antenna device according to claim 1, wherein said second antenna element has a length adapted for use with the GPS system.

11. The antenna device according to claim 10, wherein said second antenna element has a length of about one-quarter wavelength of a GPS signal.

12. The antenna device according to claim 1, wherein at least one of said first and second antenna elements is provided with a grounding portion.

13. The antenna device according to claim 1, wherein said first and second antenna elements, have first and second feed portions respectively each of said feed portions are connected to separate electronic circuitry.

14. The antenna device according to claim 1, wherein said first distance is shorter than said third distance.

15. The antenna device according to claim 1, wherein said second distance is shorter than said third distance.

16. The antenna device according to claim 1, wherein said first antenna element constitutes part of a planar inverted F antenna.

17. A portable radio communication device, comprising:

a housing;

a user interface; and an antenna device, said antenna device further comprising:

a ground conductor being positioned essentially in a plane and having front and back surfaces and an upper and a lower end portion, a first antenna element having an upper end portion and a lower end portion, said first element being essentially parallel to and spaced apart from, said back surface of said ground conductor by first distance, wherein said first antenna element is adapted to receive linearly polarized radio signals; and a second antenna element being spaced apart from said upper end portion of said ground conductor by a second distance, and said second antenna element being spaced apart form said upper end portion of said first antenna element by a third distance, wherein said second antenna element is elongated and is adapted solely to receive circularly polarized radio signals by operation with linear polarization.

18. The portable radio communication device according to claim 17, wherein said antenna device is positioned in the upper portion of the radio communication device.

19. The portable radio communication device according to claim 18, wherein said second antenna element of said antenna device is positioned in the top of the radio communication device.

*20. An antenna device for a portable radio communication device, comprising:*

*a ground conductor positioned essentially in a plane,*

*an antenna element being spaced apart from said ground conductor and meander shaped,*

*wherein said antenna element is elongated and is adapted solely to receive circularly polarized radio signals by operation with linear polarization.*

*21. The antenna device according to claim 20, wherein said antenna element is essentially strip shaped.*

*22. The antenna device according to claim 20, wherein said antenna element is positioned in a plane essentially perpendicular to said plane of said ground conductor.*

*23. The antenna device according to claim 20, wherein said antenna element is wire shaped.*

*24. The antenna device according to claim 20, wherein said antenna element has a length adapted for use with the GPS system.*

*25. The antenna device according to claim 24, wherein said antenna element has a length of about one-quarter wavelength of a GPS signal.*

*26. A portable radio communication device, comprising:*

*a housing;*

*a user interface; and*

*an antenna device, said antenna device further comprising:*

*a ground conductor, and*

*an antenna element being spaced apart from said ground conductor and meander shaped, wherein said antenna element is elongated and is adapted solely to receive circularly polarized radio signals by operation with linear polarization.*

*27. The portable radio communication device according to claim 26, wherein said antenna device is positioned in the upper portion of the radio communication device.*

* * * * *